(12) United States Patent
Heyer et al.

(10) Patent No.: US 9,908,501 B2
(45) Date of Patent: Mar. 6, 2018

(54) DEVICE FOR CONTROLLING A VOLUMETRIC FLOW RATE OF A MEDIUM STORED UNDER PRESSURE IN ORDER TO ACTIVATE AN IMPACT PROTECTION DEVICE, AND DEVICE FOR ACTIVATING AN IMPACT PROTECTION DEVICE

(71) Applicant: Robert Bosch GmbH, Stuttgart (DE)

(72) Inventors: Klaus Heyer, Freiberg (DE); Johannes Schmid, Immenstadt (DE); Ignaz Hatt, Buchenberg (DE); Tim Maier, Plochingen (DE); Franz Mayer, Haldenwang (DE); Horst Beling, Heilbronn (DE); Peter Rues, Sonthofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 15/114,717

(22) PCT Filed: Jan. 27, 2015

(86) PCT No.: PCT/EP2015/051620
§ 371 (c)(1),
(2) Date: Jul. 27, 2016

(87) PCT Pub. No.: WO2015/113974
PCT Pub. Date: Aug. 6, 2015

(65) Prior Publication Data
US 2017/0066403 A1    Mar. 9, 2017

(30) Foreign Application Priority Data

Jan. 28, 2014 (DE) .......... 10 2014 201 520
Jan. 21, 2015 (DE) .......... 10 2015 200 900
Jan. 21, 2015 (DE) .......... 10 2015 200 914

(51) Int. Cl.
*B60R 21/274* (2011.01)
*B60R 21/261* (2011.01)
(Continued)

(52) U.S. Cl.
CPC .......... *B60R 21/274* (2013.01); *B60R 21/261* (2013.01); *B60R 21/264* (2013.01);
(Continued)

(58) Field of Classification Search
CPC ... B60R 21/274; B60R 21/268; B60R 21/264; B60R 21/261; G05D 7/014; F16K 27/029; F16K 31/0675; F16K 31/122; F16K 3/24
See application file for complete search history.

(56) References Cited

U.S. PATENT DOCUMENTS 3,590,847 A * 7/1971 Worden ............... F16K 1/123
137/116.5
5,791,227 A * 8/1998 Takaku ............... B60T 13/563
137/627.5
(Continued)

FOREIGN PATENT DOCUMENTS

DE         20010176 U1   11/2000
DE     202006006965 U1   12/2006
(Continued)

OTHER PUBLICATIONS

International Search Report dated May 8, 2015, of the corresponding International Application PCT/EP2015/051620, filed on Jan. 27, 2015.

*Primary Examiner* — Darlene P Condra
(74) *Attorney, Agent, or Firm* — Norton Rose Fulbright US LLP; Gerard Messina

(57) ABSTRACT

A device for controlling a volumetric flow rate of a medium stored under pressure in order to activate an impact protec-
(Continued)

tion device, having a control module that includes a valve body having a stepped through-opening, and a control piston guided axially in the through-opening of the valve body, and a control valve that influences the movement of the control piston, the valve body having at a first end a closable medium inlet opening having a valve chamber. The control valve and the control module are situated in a common housing sleeve, the valve body of the control module being pressed into a first end of the housing sleeve until it comes to a stop on a housing shoulder, and the control valve being introduced into and fixed in a second end of the housing sleeve.

10 Claims, 3 Drawing Sheets

(51) Int. Cl.
| | | |
|---|---|---|
| *B60R 21/264* | (2006.01) | |
| *F16K 3/24* | (2006.01) | |
| *F16K 31/122* | (2006.01) | |
| *B60R 21/268* | (2011.01) | |
| *F16K 27/02* | (2006.01) | |
| *F16K 31/06* | (2006.01) | |
| *G05D 7/01* | (2006.01) | |

(52) U.S. Cl.
CPC .............. *B60R 21/268* (2013.01); *F16K 3/24* (2013.01); *F16K 27/029* (2013.01); *F16K 31/0675* (2013.01); *F16K 31/122* (2013.01); *G05D 7/014* (2013.01)

(56) References Cited

U.S. PATENT DOCUMENTS

| | | | |
|---|---|---|---|
| 6,968,855 B1* | 11/2005 | Kemmerer | ................ F16K 1/14 137/377 |
| 7,131,663 B1 | 11/2006 | Campbell et al. | |
| 2009/0072180 A1* | 3/2009 | Johnson | ................ F16K 31/122 251/324 |
| 2009/0283160 A1* | 11/2009 | Fishwick | ............ F15B 13/0405 137/596.14 |
| 2010/0012877 A1 | 1/2010 | Haege et al. | |
| 2010/0032605 A1 | 2/2010 | Haege et al. | |
| 2015/0053874 A1* | 2/2015 | Kai | ..................... F16K 31/1221 251/61.1 |
| 2015/0210243 A1* | 7/2015 | Wasserman | ........... B60R 21/268 280/736 |

FOREIGN PATENT DOCUMENTS

| | | |
|---|---|---|
| DE | 102007003321 A1 | 8/2008 |
| WO | 2008040542 A1 | 4/2008 |

\* cited by examiner

DEVICE FOR CONTROLLING A VOLUMETRIC FLOW RATE OF A MEDIUM STORED UNDER PRESSURE IN ORDER TO ACTIVATE AN IMPACT PROTECTION DEVICE, AND DEVICE FOR ACTIVATING AN IMPACT PROTECTION DEVICE

FIELD

The present invention is based on a device for controlling a volumetric flow rate of a medium stored under pressure in order to activate an impact protection device, and on a device for activating an impact protection device.

BACKGROUND INFORMATION

A volumetric flow for filling an airbag of a vehicle is standardly produced by a hot gas generator, or by pyrotechnics, or using a cold gas storage device. In the case of a hot gas generator, ignition tablets are for example used that, in the case of an accident, receive a signal via a control device for external ignition. The combustion of the tablets results in hot gases that directly fill an airbag. In the case of a cold gas storage device, gas is stored in a pressurized container and is tightly sealed by a burst disk. In the case of an accident, the burst disk is externally destroyed. Subsequently, the gas, stored at very high pressure, flows into the airbag.

German Patent Application No. DE 20 2006 006 965 U1 describes a pressurized storage, valve, and distributor unit as a portable or fixedly installable device for short-term (impact-type) and recoil-free release of larger quantities of pressurized air, or gas stored under pressure, for various technical applications.

SUMMARY

A device according to the present invention for controlling a volumetric flow rate of a medium stored under pressure in order to activate an impact protection device, and the device according to the present invention for activating an impact protection device, may have, in contrast, the advantage of low-cost manufacture. Thus, many components are produced by out-of-tool manufacturing technologies. More expensive manufacturing technologies having high ISO tolerance standards are used only for the component geometries absolutely required for the functioning, for example for the control piston.

Specific embodiments of the control device according to the present invention are used to control the gas volumetric flow rate of an occupant protection system in a motor vehicle. The impact protection device can be an airbag or the like. The medium can be cold gas or the like. The medium storage unit can also be referred to as gas generator, and can be fashioned to safely enclose the medium to be used for filling the impact protection device up to a time of activation of the impact protection device. As gas source, a hybrid gas generator can also be used. For purely pyrotechnic gas generators, in addition a buffer container is required that, upon ignition, can receive and buffer the resulting gas. In addition, a burst element can be provided in order to seal the medium storage unit in the form of a cover and, in the case of collision, to be easily and quickly destroyed so that the medium can flow from the medium storage unit through the device, thus reaching the impact protection device. The control piston and the valve body can be formed in order to enable a movement of the control piston in the through-opening of the valve body between the basic position and the activation position. Here, the control piston and the through-opening of the valve body can be formed to bring about a low-leakage seating of at least a part of an outer circumferential surface of the control piston on a wall of the through-opening.

Specific embodiments of the control device according to the present invention can advantageously form, or control, in a case-specific manner, a volumetric flow of a medium under pressure with which an impact protection device is to be filled. In a cold gas generator for an airbag, for example, such a forming of the volumetric flow can be achieved using a control module in which in particular a control piston can advantageously be moved back and forth in a defined fashion through the medium, via a control valve, so that specified outlet ducts or outlet openings are released or closed. Such a forming of the volumetric flow is distinguished by the possibility of repeatable blocking, adjustment, and opening of a high gas volumetric flow rate in particular for the filling of an airbag in vehicles.

Advantageously, specific embodiments of the control device according to the present invention make it possible to realize targeted volumetric flow rates in particular as a function of the weight of a person to be protected by the impact protection device. In addition, a multiple opening and closing of the supply of medium to the impact protection device can be realized in order, for example in the case of an accident having a plurality of vehicle impacts, to make use of the functional advantage of dampening by the airbag. Thus, in particular a speed of deployment of the airbag can be designed for different weight classes and sizes of persons. In this way, a protective effect of the impact protection device can be achieved largely independent of the size and/or weight of the persons to be protected.

Specific embodiments of the present invention provide a device for controlling a volumetric flow rate of a medium stored under pressure for activating an impact protection device, having a control module that includes a valve body having a stepped through-opening and a control piston guided axially in the through-opening of the valve body, and a control valve that influences the movement of the control piston. Here, the valve body has, at a first end, a closable medium inlet opening having a valve chamber and, at a second end, a control chamber having a control valve opening, at least one outlet duct branching off from the through-opening for letting the medium into the impact protection device being situated between the first end and the second end of the valve body. The control piston has a through-opening formed along its main axis of extension from a first effective surface, facing the medium inlet opening, to a second effective surface facing the control valve opening, the first effective surface being smaller than the second effective surface. The control piston is capable of being moved in the through-opening of the valve body by the medium, as a function of the position of the control valve, between a first position in which the at least one outlet duct is closed by the control piston and a second position in which the at least one outlet duct is released by the control piston. According to the present invention, the control valve and the control module are situated in a common housing sleeve, the valve body of the control module being pressed into a first end of the housing sleeve until it comes to a stop on a housing shoulder, and the control valve being introduced into and fixed in a second end of the housing sleeve.

During operation, the axial forces on the housing shoulder resulting from the pressure loading can be absorbed by the housing sleeve, produced for example as a deep-drawn part.

In addition, a device is provided for activating an impact protection device having a medium storage unit for storing the medium under pressure and a burst element for sealing a media outlet opening of the media storage unit, the device for activation including a device according to the present invention for controlling a volumetric flow rate of a medium stored under pressure for activating the impact protection device.

The control device can be fastened on the medium storage unit or gas supply container for example by crimping. As needed, the crimped connection can be reinforced by welding. The burst disk can be situated between the valve body and the medium storage unit.

It may be particularly advantageous if the valve body can have a taper at its outer circumference, so that in the state in which it is pressed in between the valve body and the housing sleeve an open space can arise into which the at least one outlet duct of the valve body can open, and at which the housing sleeve can have at least one first outlet opening.

In an advantageous embodiment of the device according to the present invention, the control valve can be realized as a magnetic valve having a magnetic assembly that, in the state in which it is supplied with current, can move an armature with a plunger against the force of a reset spring from a first position into a second position, a closing element situated on the plunger being capable, in an open position, of releasing the valve control opening for passage of the medium, and of sealing the control valve opening in a closed position. The magnetic assembly can be fixed in the housing sleeve axially by a crimp connection, and a stroke of the control valve can be specified or set via the axial position of the magnetic assembly. Thus, the setting of the stroke of the control valve can advantageously take place by displacing the complete magnet assembly in the direction of the valve body. Subsequently, the position of the magnet assembly in the housing sleeve can be fixed for example through a crimping process carried out externally on the housing sleeve.

In a further advantageous embodiment of the device according to the present invention, the armature can for example be realized as a flat disk having a central bore via which the armature can be pressed onto the plunger.

This advantageously enables a simple and low-cost manufacture of the control valve.

In a further advantageous embodiment of the device according to the present invention, a separating disk, having a central guide bore through which the plunger can be guided, can separate an armature space of the control valve from an interior space of the housing sleeve, which can have at least one second outlet opening. In this way, back-effects resulting from flow characteristics can be kept away from the armature space of the control valve.

In a further advantageous embodiment of the device according to the present invention, the control valve opening and a control valve seat fashioned on the edge of the control valve opening can be made in a valve seating plate that can be pressed into the valve body at the second end. The valve seating plate can be pressed tightly into the valve body and secured by a (possibly partial) caulking.

In a further advantageous embodiment of the device according to the present invention, the valve body can be realized in two parts, such that a first valve body part can form a plurality of outlet ducts and the valve chamber, and the second valve body part can form the control chamber. The first valve body part and the second valve body part can for example be connected to one another by a press-fit connection. In this way, the costly boring of the large number of cross-holes can be avoided, and the manufacture of the valve body can be further simplified.

Exemplary embodiments of the present invention are shown in the figures and are explained in more detail below. In the Figures, identical reference characters designate components or elements that carry out the same, or analogous, functions.

DETAILED DESCRIPTION OF EXAMPLE EMBODIMENTS

Figure 1:
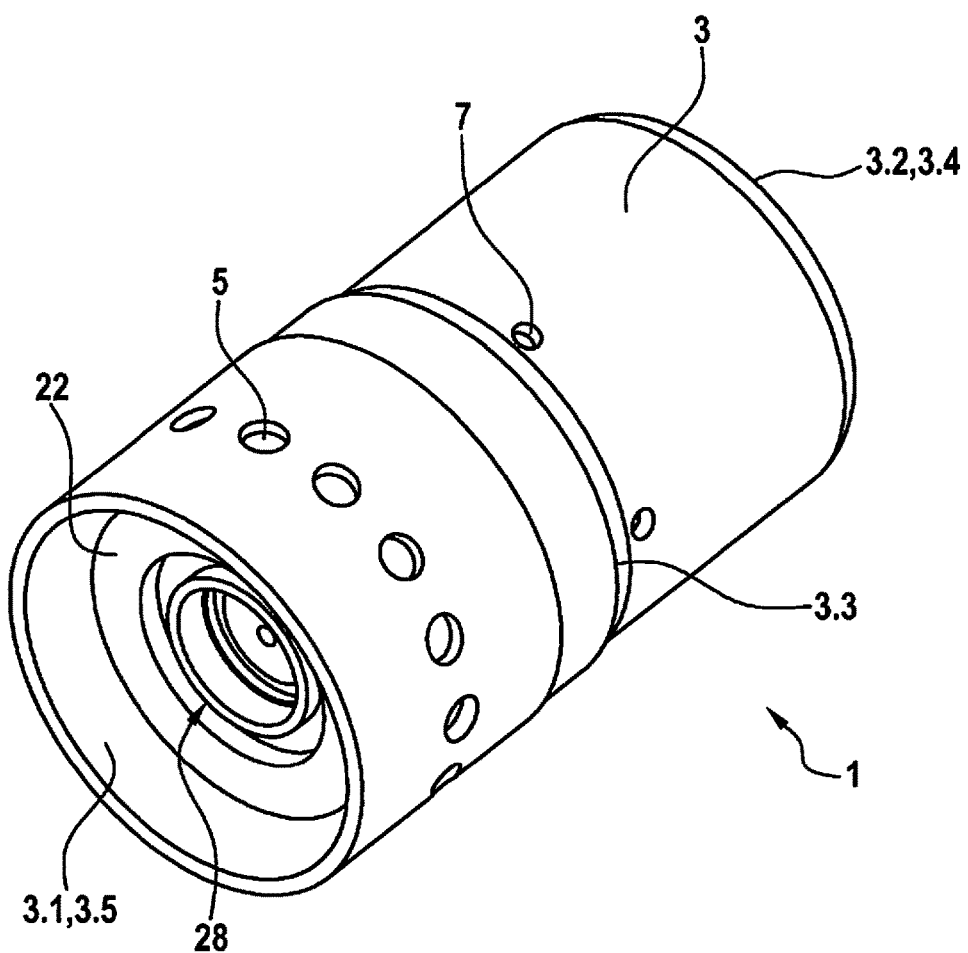
FIG. 1 shows a schematic perspective representation of an exemplary embodiment of a device according to the present invention for controlling a volumetric flow rate of a medium stored under pressure in order to activate an impact protection device.

As can be seen from FIGS. 1 through 4, the depicted exemplary embodiment of a device 1 according to the present invention for controlling a volumetric flow rate of a medium stored under pressure in order to activate an impact protection device includes a control module 20 that includes a valve body 22, 22A, 22B having a stepped through-opening 22.3, 22.3A, 22.3B, and a control piston 26 guided axially in through-opening 22.3, 22.3A, 22.3B of valve body 22, 22A, 22B, and a control valve 10 that influences the movement of control piston 26. Valve body 22, 22A, 22B has at a first end a closable medium inlet opening 28 having a valve chamber 22.4, 22.4A, and has at a second end a control chamber 22.5, 22.5B having a control valve opening 24.2, at least one outlet duct 22.1, 22.1A, branching off from the through-opening 22.3, 22.3A, for letting the medium into the impact protection device being situated between the first end and the second end of valve body 22, 22A, 22B. Control piston 26 has a through-opening 26.3 formed along its main axis of extension, from a first effective surface 26.1, facing medium inlet opening 28, to a second effective surface 26.2 facing control valve opening 24.2, first effective surface 26.1 being smaller than second effective surface 26.2. Control piston 26 is capable of being moved in through-opening 22.3, 22.3A, 22.3B of valve body 22, 22A, 22B by the medium and as a function of the position of control valve 10, between a first position in which the at least one outlet duct 22.1, 22.1A is closed by control piston 26 and a second position in which the at least one outlet duct 22.1, 22.1A is released by control piston 26. According to the present invention, control valve 10 and control module 20 are situated in a common housing sleeve 3, valve body 22, 22A, 22B of control module 20 being pressed into a first end 3.1 of housing sleeve 3 until it comes to a stop on a housing shoulder 3.3, and control valve 10 being introduced into and fixed in a second end 3.2 of housing sleeve 3.

Preferably, housing sleeve 3 is realized as a deep-drawn part. During operation, the axial forces on shoulder 3.3 resulting from the pressure load are absorbed by housing sleeve 3.

Figure 2:
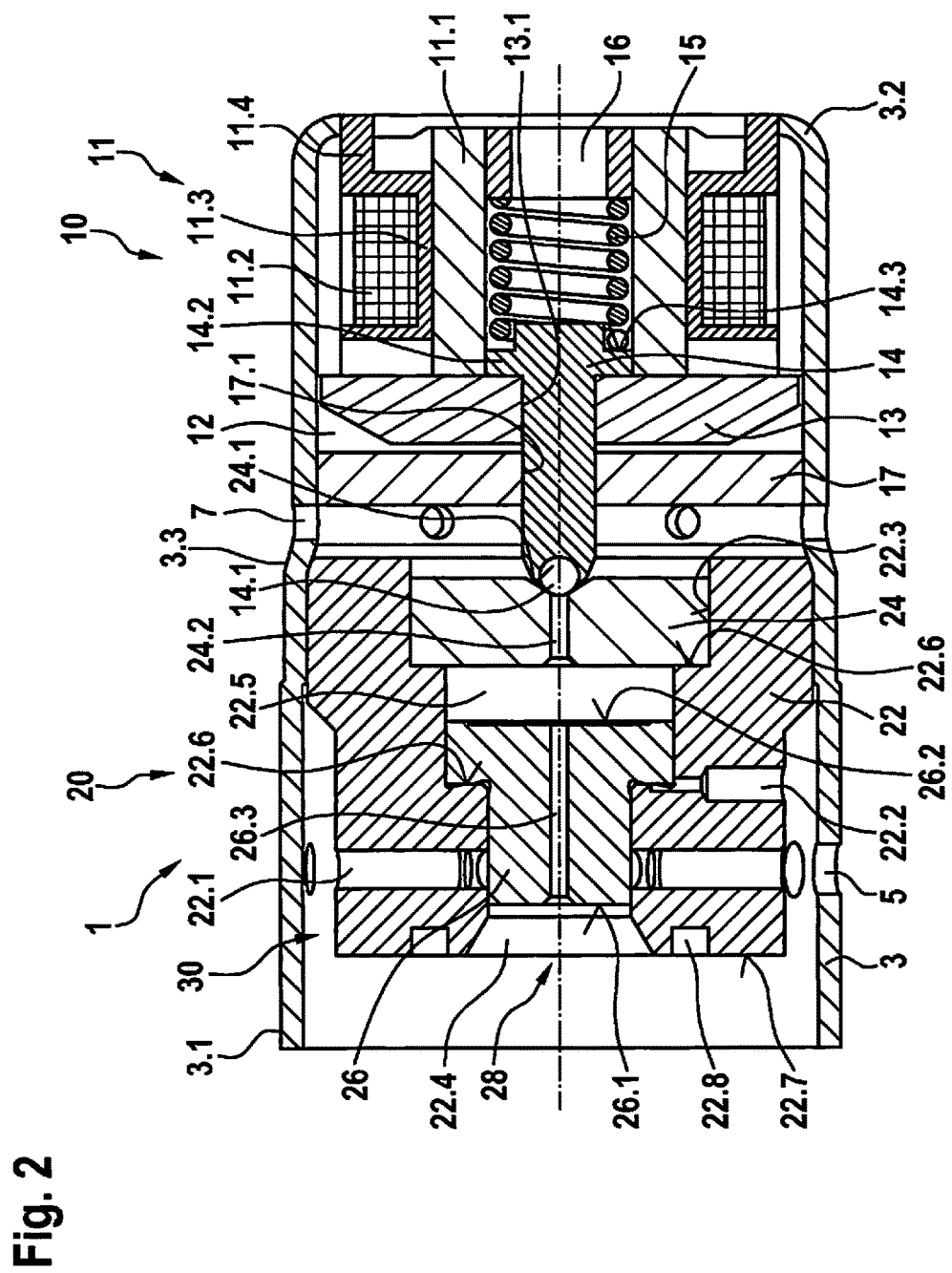
FIG. 2 shows a schematic sectional representation of the control device according to the present invention of FIG. 1.

As can be further seen from FIG. 2, control valve opening 24.2 is made in a valve seating plate 24. Valve seating plate 24 is tightly pressed into valve body 22 at the second end, and is secured by a (possibly partial) caulking. In addition, a control valve seat 24.1 is fashioned at the edge of control valve opening 24.2 in valve seating plate 24.

As can further be seen from FIG. 2, control valve 10, or pilot valve, is fashioned as a magnetic valve. Control valve 10 includes a plunger 14 having closing element 14.1, realized in the depicted exemplary embodiment as an enclosed sealing ball, an armature 13, a reset spring 15, and a magnetic assembly 11 that includes a magnet cup 11.1, an electrical coil having coil winding 11.2, winding body 11.3, and electrical contacting 11.4. Magnetic assembly 11, in the state in which it is supplied with current, moves armature 13 with plunger 14 against the force of reset spring 15, from a first position to a second position. A closing element 14.1 situated on plunger 14 releases control valve opening 24.2 in an open position for passage of the medium, and, in a closed position, seals control valve opening 24.2 and control valve seat 24.1.

In the depicted exemplary embodiment, control valve 10 is realized as a currentlessly closed valve, and, in the currentless state, has the closed state shown in FIG. 2, in which closing element 14.1 seals in control valve seat 24.1. Reset spring 15 is fashioned to hold control valve 10 in the closed position. If current is supplied to the magnetic assembly, closing element 14.1 then lifts off from control valve seat 24.1, against the force of reset spring 15, and releases control valve opening 24.2. Alternatively, in an exemplary embodiment that is not shown, control valve 10 can be realized as a currentlessly open valve. In this specific embodiment, in the currentless state closing element 14.1 releases control valve opening 24.2, and in the state supplied with current it seals control valve opening 24.2 in control valve seat 24.1. In this exemplary embodiment of control valve 10, reset spring 15 is fashioned to hold control valve 10 in the open position. When current is supplied to the magnetic assembly, closing element 14.1 is then pressed into control valve seat 24.1, against the force of reset spring 15, and seals control valve opening 24.2.

As can also be seen from FIG. 2, closing element 14.1, realized as a ball, is enclosed at the end of plunger 14 facing control valve opening 24.2. At an end of plunger 14 facing away from valve control opening 24.2, there is situated a guide ring 14.2 having a spring support shoulder 14.3 that is accommodated and axially guided in a central guide of magnet cup 11.1 of magnetic assembly 11 of control valve 10. Reset spring 15 is also situated in the guide of the magnetic cup, and is supported at one end on spring support shoulder 14.3 of plunger 14, and at the other end on a pressed-in adjustment bushing 16 via which the pre-tension force of reset spring 15 of control valve 10 can be adjusted. Plunger 14 is situated so as to be axially movable in order to open and close control valve opening 24.2. The setting of the stroke of control valve 10 takes place by displacing the complete magnetic assembly 10 in the direction of valve body 22. Subsequently, the position of the magnetic assembly in housing sleeve 3 is fixed, for example by crimping on an externally situated crimping region 3.4 of housing sleeve 3.

As can further be seen from FIG. 2, in the depicted exemplary embodiment armature 13 is realized as a flat disk having a central bore 13.1 via which armature 13 is pressed onto plunger 14. In addition, a separating disk 17 having a central guide bore 17.1 through which plunger 14 is guided is pressed into housing sleeve 3. Separating disk 17 separates an armature space 12 of control valve 10 from an interior space of housing sleeve 3 that has at least one second outlet opening 7. Separating disk 17 advantageously keeps back-effects caused by flow conditions away from armature space 12 of control valve 10.

The impact protection device can be realized for example as an airbag of a personal protection system. The device for activating the impact protection device can for example be realized as a cold gas generator that has control device 1 according to the present invention in order to form the volumetric flow for activating or filling the airbag. The medium stored under pressure is a cold gas in this exemplary embodiment of the present invention. The device for activating the impact protection device has a medium storage unit (not shown), a burst element (not shown) that seals an outlet opening of the medium storage unit, and control device 1, or device 1, according to the present invention for controlling the volumetric flow rate of the medium stored under pressure in order to activate the impact protection device. Control device 1 has control module 20 having valve body 22 and control piston 26 and control valve 10. Control device 1 is coupled to the medium storage unit, the burst element being situated between the outlet opening of the medium storage unit and inlet opening 28 of control device 1. Valve body 22 and control piston 26 are situated between control valve 10 and the medium storage unit. The burst element is fashioned to hold, in an intact state, the medium under pressure in the medium storage unit and, in a burst state, to let the medium flow out from the medium storage unit into control device 1 and, if warranted, into the airbag. Here, the overall control device 1 is fastened on first end 3.1 of housing sleeve 3, for example through crimping on the medium storage unit (not shown). As needed, the fastening can be reinforced by welding. Before the fastening, the burst plate is attached between valve body 22 and the gas container. In a flange surface 22.7 at the gas storage unit, on valve body 22 there is made a sealing ring groove 22.8 in order to limit pressure axial forces.

In the depicted exemplary embodiment of the present invention, valve body 22 is realized as a hollow cylindrical component. Stepped through-opening 22.3 extends in valve body 22 along an axis of longitudinal extension of valve body 22, through valve body 22, and connects a valve chamber 22.4 situated at the first end of valve body 22 with a control chamber 22.5 situated inside valve body 22, in which control piston 26 is guided. Valve body 22, or valve chamber 22.4, has at the first end medium inlet opening 28 to the medium storage unit, which in the assembled state is sealed by the burst element. Valve body 22 has at the second end valve seating disk 24 having control valve opening 24.2 to control valve 10. Control chamber 22.5 thus has control valve opening 24.2 at its second end.

Valve body 22 has a plurality of outlet ducts 22.1 between valve chamber 22.4 and control chamber 22.5, in order to allow the medium to flow out into the impact protection device. In addition, valve body 22 has a taper in this region on its outer circumference, so that in the pressed-in state an open space arises between valve body 22 and housing sleeve 3. Outlet ducts 22.1 of valve body 22 open into this open space. In addition, housing sleeve 3 has, in the region of the open space, a plurality of first outlet openings 5 for letting the medium into the impact protection device. In addition, valve body 22 has at least one stress relief duct 22.2 that connects control chamber 22.5 to the open space. Stress relief duct 22.2 relieves a vacuum between valve body 22 and control piston 26. Stress relief duct 22.2 is situated in the region of a first step-shaped stop segment 22.6 of through-opening 22.3 of valve body 22. The first step-shaped stop segment acts as a stop 22.6 for control piston 26. Between the first step-shaped stop segment and medium inlet opening 28, through-opening 22.3 has a first inner diameter that is smaller than a second inner diameter of through-opening 22.3 in the region of control chamber 22.5. In addition, through-opening 22.3 has, at the second end of valve body 22, a second step-shaped stop segment that acts as stop 22.6 for the valve seating disk.

Control piston 26 is situated so as to be axially movable in through-opening 22.3. First effective surface 26.1 of control piston 26 is situated adjacent to medium inlet opening 28 of valve body 22. Second effective surface 26.2 of control piston 26 is situated adjacent to control valve opening 24.2. Here, first effective surface 26.1 is smaller than second effective surface 26.2. Control piston 26 is formed to lie in fluid-tight fashion, at least with a partial segment of an outer circumferential surface, against a wall of through-opening 22.3. Control piston 26 has a step-shaped collar segment. Between first effective surface 26.1 and the step-shaped collar segment, control piston 26 has a first outer diameter that is smaller than a second outer diameter between the step-shaped collar segment and second effective surface 26.2. Control piston 26 is movable in through-opening 22.3 of valve body 22 by the medium and as a function of a position of control valve 10, between a basic position in which outlet ducts 22.1 are closed by control piston 26 and an activation position in which outlet ducts 22.1 are released for the medium flowing through. In the depicted basic position of control piston 26, the step-shaped collar segment of control piston 26 lies on the step-shaped stop segment 22.6 of through-opening 22.3 of valve body 22.

In the following, the functioning is described of the depicted exemplary embodiment of device 1 according to the present invention for controlling a volumetric flow rate of a medium stored under pressure in order to activate an impact protection device. The movement of control piston 26 is brought about by the medium flowing through control device 1 and the position of control valve 10. The medium flows out from the medium container when the burst element has been destroyed, for example by ignition tablets. If, in contrast to the representation shown in FIG. 2, control valve opening 24.2 is opened by control valve 10, then control piston 26 is moved by the medium flowing out from the medium storage unit from the depicted basic position to an activation position (not shown). In this movement, the medium flowing out from the medium storage unit acts on first effective surface 26.1 and displaces control piston 26 in the direction of control valve 10. The medium stored at high pressure flows through the opened outlet ducts 22.1 and first outlet openings 5 into the impact protection device, and for example fills the airbag. The medium also flows through through-opening 26.3 of control piston 26. As long as control valve 10 is open, no pressure can be built up on second effective surface 26.2 of control piston 26 that triggers a movement of control piston 26 back into the basic position, and a lower pressure acts on second effective surface 26.2 than on first effective surface 26.1. Therefore, control piston 26 remains in the activation position, in which outlet ducts 22.1 are open.

Stress relief duct 22.2 is used to relieve a vacuum that arises between through-opening 22.3 and control piston 26.

If control valve opening 24.2 is closed by control valve 10, then in control chamber 25 a pressure is built up that acts on second effective surface 26.2, which pressure triggers the movement of control piston 26 back into the basic position. Due to the fact that second effective surface 26.2 is larger than first effective surface 26.1, the force built up on second effective surface 26.2 is also larger. This has the result that control piston 26 is pushed back into the basic position by the medium. Control piston 26 is pushed up to stop 22.6, and closes outlet ducts 22.1. A sealing takes place either radially through a piston guiding or axially through a flat seating or ball seating.

Figure 3:
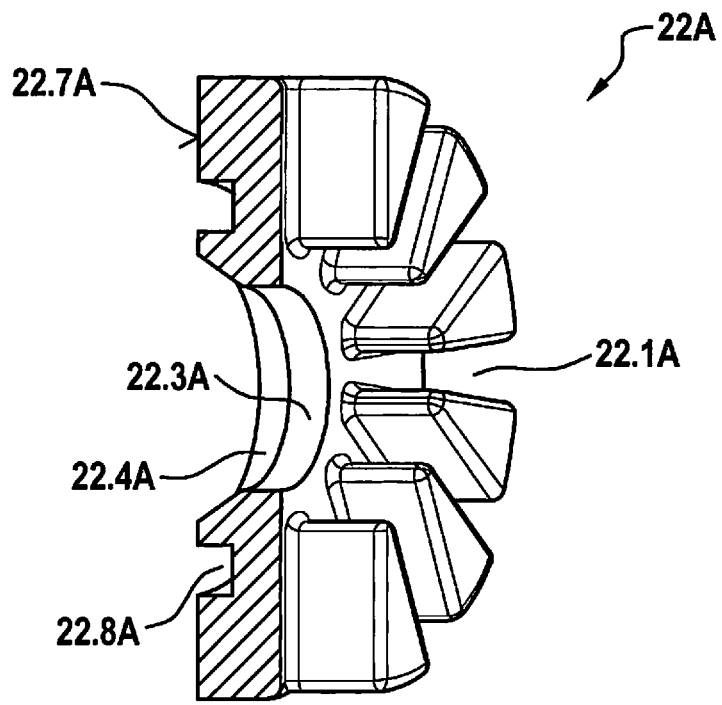
FIG. 3 shows a schematic perspective sectional representation of a first valve body part for the control device according to the present invention of FIG. 1.
Figure 4:
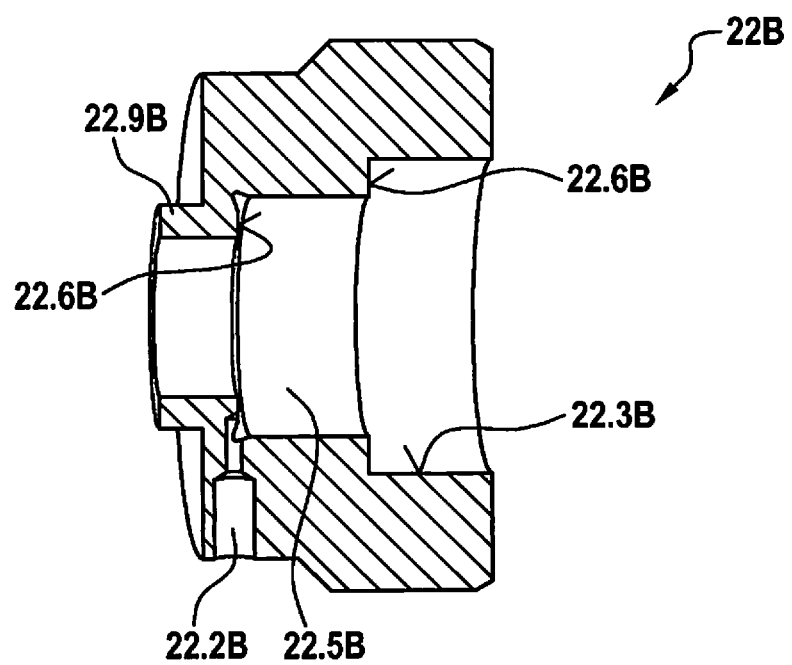
FIG. 4 shows a schematic perspective sectional representation of a second valve body part for the control device according to the present invention of FIG. 1.

As can be seen from FIGS. 3 and 4, valve body 22 can be assembled from two individual parts 22A, 22B in order to further simplify manufacture. As is further visible in FIG. 3, a first valve body part 22A forms a plurality of outlet ducts 22.1A, valve chamber 22.4A, and a part of through-opening 22.3A. Second valve body part 22B forms control chamber 22.5B and a second part of through-opening 22.3B having step-shaped stop segments 22.6B. First valve body part 22A can for example be produced as a simple injection-molded part. In this way, the costly boring of the large number of cross-holes as outlet ducts 22.1A can be avoided. Individual parts 22A, 22B can be held together by a press-fit connection. For this purpose, second valve body part 22B has a press-in collar 22.9B.

What is claimed is:

1. A device for controlling a volumetric flow rate of a medium stored under pressure in order to activate an impact protection device, comprising:
    a control module that includes a valve body having a stepped through-opening;
    a control piston guided axially in the through-opening of the valve body; and
    a control valve that influences the movement of the control piston;
    wherein the valve body has, at a first end, a closable medium inlet opening having a valve chamber, has, at a second end, a control chamber having a control valve opening, and has at least one outlet duct, that branches off from the through-opening, for letting the medium into the impact protection device, and is situated between the first end of the valve body and the second end of the valve body;
    wherein the control piston has a through-opening formed along its main axis of extension, from a first effective surface facing the medium inlet opening to a second effective surface facing the control valve opening, the first effective surface being smaller than the second effective surface, the control piston being capable of being moved in the through-opening of the valve body by the medium and, as a function of the position of the control valve, between a first position in which the at least one outlet duct is closed by the control piston and a second position in which the at least one outlet duct is released by the control piston; and
    wherein the control valve and the control module are situated in a common housing sleeve, the valve body of the control module being pressed into a first end of the housing sleeve until it comes to a stop on a housing shoulder, and the control valve being introduced into and fixed in a second end of the housing sleeve.

2. The device as recited in claim 1, wherein the valve body has a taper on its outer circumference, so that in the pressed-in state an open space arises between the valve body and the housing sleeve, into which space the at least one outlet duct of the valve body opens, and at which the housing sleeve has at least one first outlet opening.

3. The device as recited in claim 1, wherein the control valve is a magnetic valve having a magnetic assembly, which, in the state supplied with current, moves an armature having a plunger against a force of a reset spring, from a first position into a second position, a closing element situated on the plunger releasing the control valve opening in an open position for a passage of the medium, and sealing the control valve opening in a closed position.

4. The device as recited in claim 3, wherein the magnetic assembly is fixed axially in the housing sleeve by a crimp connection, a stroke of the control valve being specified via the axial position of the magnetic assembly.

5. The device as recited in claim 3, wherein the armature is a flat disk having a central bore via which the armature is pressed onto the plunger.

6. The device as recited in claim 3, wherein a separating disk having a central guide bore through which the plunger is guided separates an armature space of the control valve from an interior space of the housing sleeve, which has at least one second outlet opening.

7. The device as recited in claim 1, wherein the control valve opening and a control valve seat fashioned on an edge of the control valve opening are made in a valve seating plate that is pressed into the valve body at the second end.

8. The device as recited in claim 1, wherein the valve body is made in two parts, a first valve body part forming a plurality of outlet ducts and the valve chamber, and the second valve body part forming the control chamber.

9. The device as recited in claim 8, wherein the first valve body part and the second valve body part are connected to one another by a press-fit connection.

10. A device for activating an impact protection device, comprising:
- a medium storage unit for storing a medium under pressure;
- a burst element for sealing a medium outlet opening of the medium storage unit; and
- a device for controlling a volumetric flow rate of the medium stored under pressure in order to activate an impact protection device, the device including:
  - a control module that includes a valve body having a stepped through-opening,
  - a control piston guided axially in the through-opening of the valve body, and
  - a control valve that influences the movement of the control piston,
  - wherein the valve body has, at a first end, a closable medium inlet opening having a valve chamber, has, at a second end, a control chamber having a control valve opening, and has at least one outlet duct, that branches off from the through-opening, for letting the medium into the impact protection device, and is situated between the first end of the valve body and the second end of the valve body,
  - wherein the control piston has a through-opening formed along its main axis of extension, from a first effective surface facing the medium inlet opening to a second effective surface facing the control valve opening, the first effective surface being smaller than the second effective surface, the control piston being capable of being moved in the through-opening of the valve body by the medium and, as a function of the position of the control valve, between a first position in which the at least one outlet duct is closed by the control piston and a second position in which the at least one outlet duct is released by the control piston, and
  - wherein the control valve and the control module are situated in a common housing sleeve, the valve body of the control module being pressed into a first end of the housing sleeve until it comes to a stop on a housing shoulder, and the control valve being introduced into and fixed in a second end of the housing sleeve.

* * * * *